2,853,495
PREPARATION OF 2,4-MONOFURFURYLIDENE SORBITOL

Simon L. Ruskin and Robert C. Hockett, New York, N. Y.

No Drawing. Application June 4, 1954
Serial No. 434,656

2 Claims. (Cl. 260—340.7)

The invention relates to a process for manufacturing laevo-ascorbic acid and salts thereof, to certain steps in that process, and to certain intermediate products formed during the process and capable of ready conversion into compounds of antiscorbutic value.

The primary object of the present invention is to provide a procedure by which laevo-ascorbic acid or its salts can be produced more economically than by previous methods.

The present commercial process for producing vitaimin C utilizes sorbose as its starting material. The production of sorbose from sorbitol is a moderately expensive proposition.

The primary object of the present invention is to produce laevo-ascorbic compounds from sorbitol without converting the sorbitol to sorbose.

A further object of the invention is to provide, as a step in such a procedure, an improved method of producing $l$-xylose from 2,4-monofurfurylidene sorbitol.

Another object of the invention is to produce, as a new compound, calcium 2-keto-gulonate, which is readily convertible to ascorbic acid compounds.

Still another object of the invention is to provide an improved method of converting 2-keto-gulonates to compounds of laevo-ascorbic acid.

Further objects and advantages of the invention will appear more fully from the following description.

The procedure followed, according to the present invention, preferably starts with sorbitol and produces calcium ascorbate. It is represented as follows:

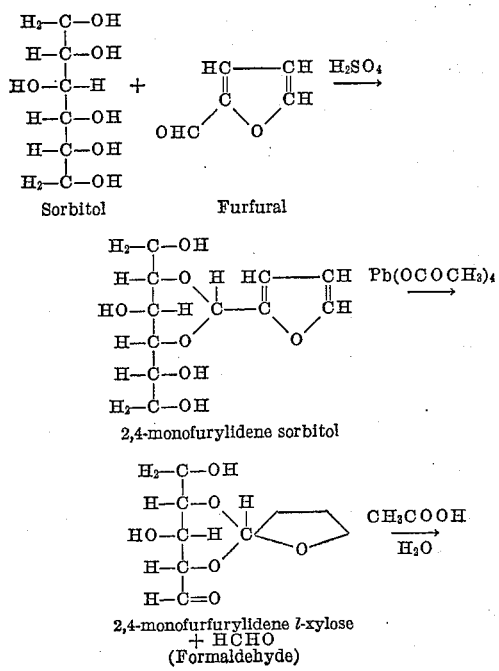

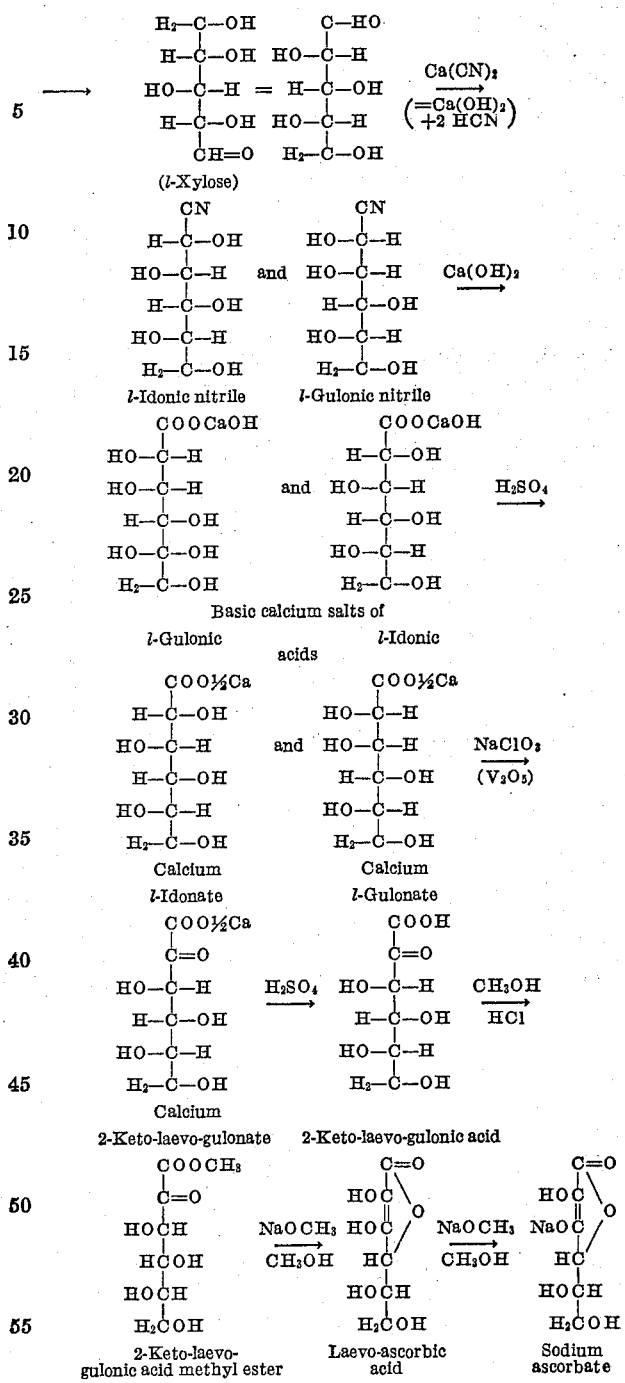

Examples of the process are as follows:

EXAMPLE I

1. *Production of 2,4-monofurfurylidenesorbitol*

140 grams of crystalline powdered sorbitol (0.77 mol) is mixed with 30 cc. of 3 N sulfuric acid in a wide mouth conical flask and heated on a water bath (loosely stoppered or covered with a watch glass) until homogeneous. The syrup is cooled to room temperature and 64 ml. of freshly distilled furfural added (74.2 g. or 0.77 mol). At first, two layers form. The mixture is shaken to facilitate mixing. In about twenty minutes crystals begin to form. In half an hour, further shaking becomes unnecessary and the mixture is allowed to stand for another hour and a half. The total time is two hours.

The mixture is then chilled for an hour to bring out more crystals, and 150 ml. of absolute isopropyl alcohol is added to thin out the crystal mush. The crystals are then spun dry in a centrifuge on an acid-resistant screen and washed several times with cold isopropyl alcohol. The last wash contains 5 ml. of strong aqua ammonia in 100 ml. of acetone. (Acetone may be used in place of isopropyl alcohol in both stages of this step).

The first crop of crystals, when air-dried weighs about 40 g. corresponding to about 70% of the theoretic yield, and melts about 191–192° C.

Additional crystals separate from the mother liquor, which is chilled overnight and then centrifuged. The second crop of crystals, when similarly washed and air dried, brings the yield up to about 75–90% of the theoretical.

2. Oxidation of 2,4-monofurfurylidenesorbitol to l-xylose 400 ml. of glacial acetic acid and 45 ml. of acetic anhydride are mixed and warmed to 75° C. Then 80 g. of C. P. red lead ($Pb_3O_4$) is added, a few grams at a time with good stirring, until all has been dissolved. Not more than traces of brown lead dioxide are formed if stirring is efficient and the red lead is added at the proper rate. The temperature rises a little without application of outside heat. The temperature of the solution is kept around 90° C. by regulation of the rate of addition of red lead.

The 2,4 monofurfurylidenesorbitol is dissolved in 300 ml. of hot water (90° C.) containing a few drops of ammonia to assure absence of any free acid, then the solution is cooled to room temperature. Much of the sorbitol derivative reseparates in very fine needle crystals. With good stirring, the hot acetic acid solution of lead compounds is cooled to the point where lead tetra acetate just begins to separate and is then added in a slow stream with good stirring, over a period of about two minutes. Stirring is continued until starch-iodide test paper shows the absence of oxidant.

The reaction solution, containing acetic acid, water, furfurylidene-l-xylose, lead diacetate and formaldehyde, is then heated near boiling for 30 minutes to complete the hydrolysis of furfurylidene-l-xylose to free xylose and furfural. The cooled solution is then filtered and concentrated under reduced pressure to a syrup of such consistency that it will just flow readily. The distillate, containing most of the acetic acid together with a little water, formaldehyde and furfural is colleced for recovery of acetic acid for reuse by rectification.

The syrup containing l-xylose and lead diacetate with traces of acetic acid, is poured slowly with good stirring into 200 ml. of warm dioxane. The precipitated lead diacetate is filtered, washed with dioxane, and dried for disposal as a by-product.

The dioxane solution of l-xylose, which is nearly free of lead, is concentrated under reduced pressure to a thick syrup which is taken up in a minimum volume of warm absolute alcohol and seeded with l-xylose. The first crop of crystals weighs 11–12 grams, representing a yield of 65 to 75% of the theoretical. A second crop obtained by reconcentrating mother liquors and washing brings the yield to 90% or more. The l-xylose melts at 128–131° C. (uncorr.) and shows a specific rotation, at equilibrium, in water (C, about 0.5 g./100 cc.; D line of sodium; 20° C.)—18.1°. After one recrystallization from a very small volume of water by addition of absolute alcohol, the melting point rises to 137–137.5° corr. and the specific rotation to —19.4°.

3. Production of calcium l-gulonate and calcium l-idonate from l-xylose, and oxidation of the mixed calcium salts to calcium 2-keto-laevo-gulonate 120 grams of l-xylose is dissolved in 600 cc. of water. To this solution is added a solution of 43 g. $Ca(CN)_2$ in 440 ml. of water, rinsed in with 240 cc. of water to make a total volume of 1280 ml. water. The mixture is shaken and stoppered. The next day, 80 g. of CaO is added in small portions with stirring. The mixture thickens in a few minutes. After about an hour it is heated in a water bath near boiling for three hours with occasional stirring. The mixture smells strongly of ammonia. It is cooled overnight and a precipitate forms which is then filtered out. The precipitate is washed twice with saturated lime water.

The precipitate of basic calcium salts is suspended in 500 ml. of water and 300 ml. of an aqueous solution containing 108 g. of $H_2SO_4$ is added slowly with stirring. Then 3 N $H_2SO_4$ is added carefully until phenolphthalein added to the solution just becomes colorless. Calcium sulfate settles as a precipitate and is filtered off leaving neutral calcium l-gulonate and calcium l-idonate in solution.

The yield of combined salt is about 93% of the theoretical, as shown by calcium analysis of the solution corrected for the soluble calcium sulfate.

The solution of salts is evaporated to 720 ml. and 175 ml. of acetic acid containing 12.6 g. of CaO dissolved to form calcium acetate buffer, is added. Then 26.6 g. of $NaClO_3$ and 3.7 g. of $V_2O_5$ is added, the mixture is shaken and is placed in the dark for six days with occasional shaking. The solution has then become dark blue indicating reduction of all $V_2O_5$. Undissolved material is filtered out, and the filtered solution is treated with 130 ml. of a solution containing 13 g. of calcium ferrocyanide. A green precipitate of vanadyl ferrocyanide settles out and the ferrocyanide is in slight excess over that required. Dilute aqueous zinc sulfate is added to precipitate this, with care to avoid any excess.

The vanadyl and zinc ferrocyanides are filtered out and the filtrate evaporated to a syrup to remove excess acetic acid; the syrup is taken up in 200 ml. of hot water, filtered, and the filtrate evaporated to a volume of 400 ml., heated, and 500 ml. of methanol are added with shaking. The precipitate of calcium 2-keto-laevo-gulonate from the alcohol solution is at first gummy, but becomes a friable powder on drying in a vacuum desiccator at normal temperature.

4. Preparation of 2-keto-laevo-gulonic acid methyl ester from calcium 2-keto-laevo-gulonate 10 g. of calcium 2-keto-gulonate is dissolved in 50 cc. of water and an exactly equivalent volume of 1/N sulfuric acid added. Calcium sulfate precipitates. The solution is filtered, and the remaining solution is evaporated to dryness and taken up in 100 ml. of methanol. Three ml. of methanol containing 1.5 g. dry hydrogen chloride is added and the mixture boiled under reflux for two hours with careful exclusion of atmospheric moisture, in the presence of porous porcelain chips.

The filtered solution is evaporated to dryness and taken up in 20 cc. of hot methanol. On cooling and seeding, the ester will crystallize but it need not be separated.

5. Production of sodium ascorbate from 2-keto-laevo-gulonic acid methyl ester To the solution of 2-keto-laevo-gulonic acid methyl ester in methanol is added 1.30 g. of sodium methylate in small portions. The mixture is heated at 45–50° C. for about twelve minutes with stirring and allowed to digest and cooled to room temperature. The originally suspended material dissolves. It is seeded with crystals of sodium ascorbate and then a fine granular precipitate settles out. The sodium ascorbate is filtered, washed twice with 10 ml. of methanol, and dried in a vacuum desiccator at room temperature.

Titration with dichlorobenzenone indophenol solution shows it to be virtually pure sodium ascorbate.

This procedure has many advantages over those heretofore known, both as a whole and in many of the individual steps.

Following condensation of sorbitol with furfural, the use of ammonia for neutralizing the sulfuric acid is largely avoided by centrifuging off practically all the mother liquors containing sulfuric acid, and washing out traces of the acid with an inert solvent such as acetone or isopropyl alcohol, with use of ammonia only in the last wash. This method practically avoids formation of hydrofuramide from interaction of ammonia with excess or uncombined furfural, and thus prevents much darkening of the solution as well as contamination by an impurity that is difficult to remove later. Other solvents for sulfuric acid which are inert to furfural can be used, as, for example, ether or pyridine.

In the oxidation of the 2,4-monofurfurylidenesorbitol to $l$-xylose, the use of red lead dissolved in acetic acid instead of isolated lead tetraacetate also is advantageous. The solution is cheaper and easier to handle than solid lead tetraacetate, which is hygroscopic, decomposes when exposed to atmospheric moisture, and is hard to filter, store and weigh quantitatively. The recovery of lead is simplified, since all of it is recovered at one point in the process and in the form of lead acetate, instead of at two separate points, first in the manufacture of lead tetraacetate and then following use of lead tetraacetate in the process.

It is also advantageous to use a suspension of 2,4-monofurfurylidenesorbitol in the oxidation step instead of a solution, since this plan greatly reduces the volume of water employed and eliminates the time and cost of subsequent evaporation of this water. Further, the procedure is not carried out in hot aqueous solution, but at a comparatively low temperature. This increases the yield because the oxidation then proceeds faster than hydrolysis of the protecting furfurylidene groups. This is significant because the furfurylidene is relied upon to confine the oxidation of the 5-6 position. There is a competition between the rates of oxidaton and hydrolysis: the higher the temperature the faster the hydrolysis and the less favorable the conditions for a clean oxidation.

In the third step of the process, the use of sulfuric acid to precipitate the lead salts is avoided. Instead, acetic acid is used, which is the medium employed as a solvent in introducing the oxidant in the previous step and therefore is already present. Simple heating, following the oxidation, in the presence of acetic acid already present is sufficient to bring about hydrolysis of furfurylidene groups and to produce free $l$-xylose. The quantitative removal of excess sulfuric acid, after its use for hydrolysis of furfurylidene groups and precipitation of lead, is difficult and expensive.

The use of a selective solvent, for the $l$-xylose such as dioxane, to separate lead diacetate from $l$-xylose, also improves the efficiency and economic value of the process, since lead diacetate is more valuable as a byproduct than lead sulfate and can also be more easily reconverted into lead tetraacetate for reuse in the process.

It is also beneficial to be able to convert the mixture of calcium $l$-gulonate and calcium $l$-idonate, which two substances are inevitably obtained together in the cyanide addition to $l$-xylose, into a single product, calcium 2-keto-laevo-gulonate, by direct oxidation of the mixed calcium salts without separation of the two compounds. It is, by this procedure, unnecessary to replace the calcium by sodium and then to form and isolate the gulonic and idonic acids. Calcium is employed as the cation in all steps from the cyanhydrin reaction to the oxidation reactions and calcium acetate is used as a buffer during the oxidation. A higher yield is obtained than if it were necessary to convert to the sodium compounds.

It is also beneficial to use calcium ferrocyanide rather than barium ferrocyanide to remove the vanadyl salts. Calcium ferrocyanide is of sufficiently greater solubility to make the removal of the vanadyl salts much easier, and, since calcium is already present, no separate procedure to remove barium is necessary.

While in the examples we have described the crystallization of certain intermediates at certain points in the process, it is of course clear that such crystallization is not necessary when the material before crystallization is present in sufficiently pure form in the medium in which it is to be treated during the next stage of the process.

While we have described herein some embodiments of our invention, we wish it to be understood that we do not intend to limit ourselves thereby except within the scope of the claims hereto or hereinafter appended.

We claim:

1. A process of making crystalline 2,4-monofurfurylidene sorbitol, comprising the steps of reacting sorbitol with furfural in the presence of sulfuric acid to form 2,4-monofurfurylidene sorbitol in a mother liquor containing sulfuric acid and unreacted furfural, crystallizing the 2,4-monofurfurylidene sorbitol to form a mixture of crystals and mother liquor, mechanically separating the crystals and the mother liquor, washing the crystals with an inert liquid solvent for the sulfuric acid and furfural and in which the 2,4-monofurfurylidene sorbitol is insoluble, repeating the washing as necessary until said crystals are substantially free from furfural, then washing the crystals with a basic wash liquid to neutralize the sulfuric acid, and mechanically separating the crystals from the wash liquid thereby recovering crystalline 2,4-monofurfurylidene sorbitol free from residual sulfuric acid and free from dark, contaminating furfural derivatives.

2. The process recited in claim 1 in which said solvent is a member selected from the group consisting of acetone, isopropyl alcohol, ether and pyridine, and in which said base is ammonia.

References Cited in the file of this patent

UNITED STATES PATENTS

| | | |
|---|---|---|
| 2,044,793 | Isbell | June 23, 1936 |
| 2,153,311 | Pasternack | Apr. 4, 1939 |
| 2,188,777 | Pasternack et al. | Jan. 30, 1940 |
| 2,265,121 | Reichstein | Dec. 2, 1941 |
| 2,584,129 | Hockett | Feb. 5, 1952 |
| 2,606,918 | Isbell | Aug. 12, 1952 |